Figure 1:
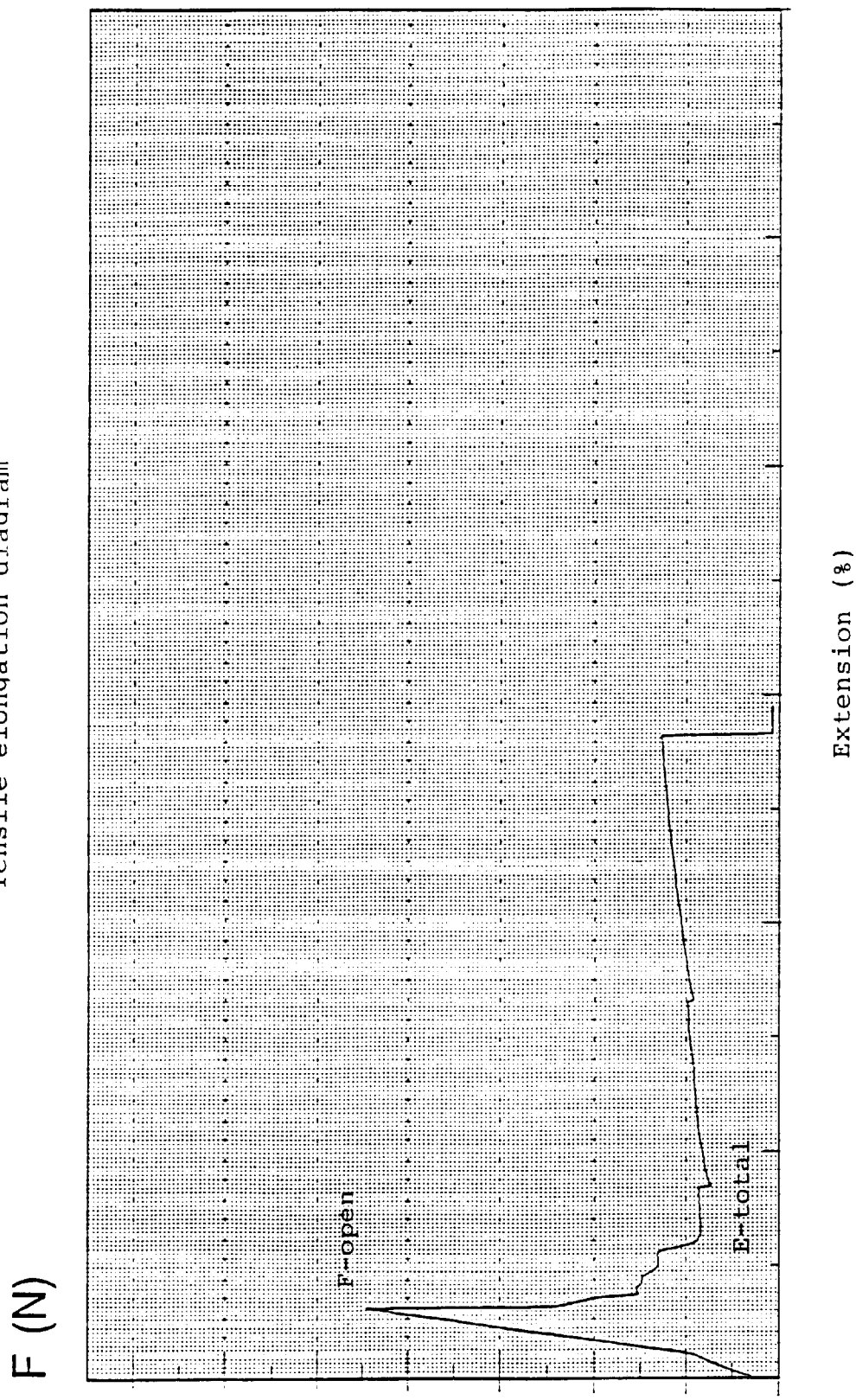

United States Patent [19]
Kuiper et al.

[11] Patent Number: 5,992,997
[45] Date of Patent: Nov. 30, 1999

[54] OPHTHALMIC LENSES

[75] Inventors: Hans Leonard Kuiper, Velp; Robert Winston van de Graaf, Arnhem, both of Netherlands

[73] Assignee: Akzo Nobel nv, Arnhem, Netherlands

[21] Appl. No.: 08/875,990

[22] PCT Filed: Feb. 1, 1996

[86] PCT No.: PCT/EP96/00445

§ 371 Date: Sep. 22, 1997

§ 102(e) Date: Sep. 22, 1997

[87] PCT Pub. No.: WO96/24865

PCT Pub. Date: Aug. 15, 1996

[30] Foreign Application Priority Data

Feb. 12, 1995 [EP] European Pat. Off. .............. 95200336

[51] Int. Cl.$^6$ .................................................. G02C 7/02
[52] U.S. Cl. ........................................ 351/159; 351/177
[58] Field of Search ..................................... 351/159, 177

[56] References Cited

U.S. PATENT DOCUMENTS

| | | | |
|---|---|---|---|
| 4,959,451 | 9/1990 | Uchida et al. | 528/272 |
| 5,196,492 | 3/1993 | Renzi et al. | 526/261 |
| 5,218,067 | 6/1993 | Uchida et al. | 526/261 |
| 5,663,279 | 9/1997 | Kuiper et al. | 528/196 |
| 5,694,195 | 12/1997 | Engardio et al. | 351/177 |

FOREIGN PATENT DOCUMENTS

| | | |
|---|---|---|
| 0 035 304 | 9/1981 | European Pat. Off. . |
| 0 284 139 | 9/1988 | European Pat. Off. . |
| 0 312 091 | 4/1989 | European Pat. Off. . |
| 0 371 140 | 6/1990 | European Pat. Off. . |
| 0 473 163 | 3/1992 | European Pat. Off. . |
| 191075 | 7/1989 | Japan . |
| 340339 | 12/1989 | Japan . |
| WO 95/06266 | 3/1995 | WIPO . |

OTHER PUBLICATIONS

*Kirk–Othner Encyclopedia of Chemical Technology*, Third Edition, vol. 2, Alkoxides, Metal to Antibiotics (Peptides), A Wiley–Interscience Publication, John Wiley & Sons, p. 111.

*Chemical Abstract*, JO 3199–218–A.
*Chemical Abstract*, JO 3054–213–A.
*Chemical Abstract*, JO 1244–401–A.

*Primary Examiner*—Scott J. Sugarman
*Attorney, Agent, or Firm*—Ralph J. Mancini

[57] ABSTRACT

The present invention relates to ophthalmic lenses with a refractive index from 1.498 to 1.505, which are the cured product of compositions comprising 60–99 wt. % of at least one poly(allyl carbonate) of a polyhydroxy alcohol, said polyhydroxy alcohol having from 2 to 20 carbon atoms and from 2 to 6 hydroxy groups in the molecule, 0.05 to 5 wt. % of at least one diallyl phthalate type oligomer, 0–20 wt. % of comonomers, and 0.01 to 10 wt. % of a radical initiator. These ophthalmic lenses have the advantage of reduction of mould damage during their preparation without any other lens property, such as yellowness index and barcol hardness, undergoing significant change. The present invention also relates to the production of ophthalmic lenses and the use of diallyl phthalate type oligomers in ophthalmic lenses.

11 Claims, 1 Drawing Sheet

OPHTHALMIC LENSES

The present invention relates to ophthalmic lenses, a process for the production of ophthalmic lenses, and the use of diallyl phthalate type oligomers in ophthalmic lenses.

Recently, organic glass has begun to replace inorganic glass in optical elements, such as windows, prisms, cameras, television screens, telescopes, and ophthalmic lenses. The term ophthalmic lenses refers to corrective lenses as well as non-corrective lenses such as sunglasses. Organic glass possesses several favourable characteristics, including a lighter weight and better safety, e.g., better impact resistance, than inorganic glass.

Conventional materials used in organic glass include polystyrene resin, polymethyl methacrylate resin, and polycarbonate resin. However, these polymers have their respective disadvantages. For example, polymethyl methacrylate resin is liable to high moisture absorption which changes its shape and refractive index. Also, polystyrene resin and polycarbonate resin have the disadvantage of giving rise to birefringence, light scattering, and loss of transparency with time. Furthermore, polymethyl methacrylate and polystyrene are neither scratch nor solvent resistant.

Organic glass made up of the products of the radical polymerization of poly(allyl carbonates) of polyhydroxy alcohols is also known, for example from European patent application 0 473 163. These polymers do not have the above-mentioned problems. However, when applying poly (allyl carbonates) of polyhydroxy alcohols in ophthalmic lenses another problem occurs, i.e. mould damage.

Ophthalmic lenses are made by polymerising a monomer between two glass moulds. Glass is the preferred material because the moulds have to be cleaned after casting, and such cleaning is usually carried out with strong lye or strong acid, which glass, unlike metal, is well able to withstand. Also, glass can easily be ground and polished to a very low degree of surface roughness.

The polymerisation process is attended with shrinkage. However, the cast lens has to be a perfect casting of the curve of the glass surface. This requires good adhesion of the monomer Lo the glass mould during polymerisation.

After polymerisation of the monomer the lens has to be released from the glass moulds. In practice, this procedure is as follows: the moulds are prized apart with a wedge. A great deal of energy is released in this process, occasionally even causing a bang.

Such forceful demoulding regularly results in damage to the glass mould. A fragment of glass will be pulled out, rendering the glass mould unfit for use. This is a randomly occurring phenomenon in lens production. Ordinarily speaking, it affects several per cent of the production.

Such damage to the moulds constitutes a major cost item for the manufacturer. While simple moulds (e.g., for single vision lenses) are rather cheap, moulds for semi-finished lenses (e.g., for bifocal lenses or progressive lenses) are very expensive.

In practice, the manufacturer of lenses will optimize the process towards zero mould damage. If there is too much spoilage, one option is to add a little amount of a release agent. However, this may affect other lens properties such, as the adhesion of the anti-scratch coating film subsequently applied. Release agents thus constitute a poor solution to the problem.

Accordingly, it is the object of the present invention to provide an ophthalmic lens which can be produced with a minimum of mould damage. It is also an object of the present invention to minimize the changes in properties as compared with lenses made from poly(allyl carbonate) of a polyhydroxy alcohol, such as barcol hardness and yellowness index. Another object is to provide an ophthalmic lens onto which an anti-scratch coating may be applied without adhesion problems. These and other objects of the present invention will be explained in the description of the invention which follows.

The present invention relates to an ophthalmic lens with a refractive index of between 1.498 and 1.505, comprising the cured product of a composition comprising:

a) 60–99 wt % of at least one poly(allyl carbonate) of a polyhydroxy alcohol, said polyhydroxy alcohol having from 2 to 20 carbon atoms and from 2 to 6 hydroxy groups in the molecule, b) 0.01–10 wt % of at least one radical initiator, c) 0–20 wt % of comonomers, and d) 0.05–5 wt % of at least one diallyl phthalate type oligomer being of the formula (I)

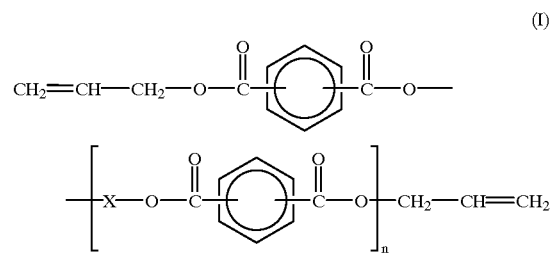

wherein X denotes a divalent hydrocarbon residue derived from a diol having 2–20 carbon atoms, optionally partly replaced by a residue derived from a polyol having 3 or more carbon atoms and 3–10 hydroxy groups, and n=1–100.

The mould damage in the production of the ophthalmic lenses of the present invention is reduced significantly without other lens properties being affected.

The ophthalmic lenses of the present invention require a refractive index of 1.498 to 1.505. More particularly, moulds used in today's industry to prepare ophthalmic lenses from poly(allyl carbonate) of a polyhydroxy alcohol (refractive index=1.498) are only suited for compositions which result in ophthalmic lenses with comparable refractive indices. A change in refractive index will result in a change in power of the lens when applying the same moulds. Compositions resulting in high refractive index lenses will require different moulds to obtain ophthalmic lenses with the same power. So, improvement of the properties of lenses by introducing certain oligomers and, optionally, comonomers cannot be achieved without limiting the refractive index of the resulting lens so that the moulds do not have to be changed. Preferably, the refractive index of the ophthalmic lenses of the present invention ranges from 1.498 to 1.502.

Japanese patent application 0 3199 218 discloses a curable composition comprising at least 10 wt % of a diallyl phthalate type oligomer, a vinyl comonomer, such as diethylene glycol diallyl carbonate, and a radical initiator. This composition may be used in optical elements such as high refractive index lenses. According to the description, cured compositions based solely on diethylene glycol diallyl carbonate have a too low refractive index resulting in thick lenses for intensive correction. Furthermore, cured compositions with less than 10 wt % of diallyl phthalate type oligomer have poor impact resistance and poor heat resistance. In addition, the application does not mention the advantage of the prevention of mould damage. So, the present invention is not disclosed by JP-A-0 3199 218. The application even teaches away from the present invention, since in view of this disclosure the skilled man would not choose a composition comprising less than 10 wt % diallyl phthalate type oligomer to produce ophthalmic lenses.

Japanese patent application 0 3054 213 discloses a composition similar to JP-A-0 3199 218. This composition may be used in coatings, sealants, paints, adhesives, and optical elements. This Japanese patent publication makes no mention of ophthalmic lenses. Neither is the present advantage of the reduction of mould damage disclosed. Accordingly, this Japanese patent application does disclose the present invention either.

European patent application 0 473 163 discloses a liquid composition comprising a poly(allyl carbonate) of a polyhydroxy alcohol and 0.01–1 wt % of an aliphatic polyol. Optionally, monomers may be present, such as diallyl phthalate, in an amount of up to 50 wt %. This composition is used for lenses. No mention is made of the use of a diallyl phthalate type oligomer. Neither is the problem relating to mould damage in the production of ophthalmic lenses from poly(allyl carbonates) of polyhydroxy alcohols disclosed.

In European patent applications 0 284 139, 0 312 091, and 0 371 040, and in Japanese patent application 01-244401, a high refractive index lens is disclosed prepared from, among others, diethylene glycol bisallylcarbonate and a diallyl phthalate monomer. A lens having a refractive index from 1.498 to 1.505 is not disclosed. Neither is the use of a diallyl phthalate type oligomer or the problem with regard to mould damage disclosed. Accordingly, these publications do not disclose the present invention.

Finally, non-prepublished patent application WO 95/06266 discloses ophthalmic lenses with a refractive index from 1.50 to 1.51 which are the cured product of compositions comprising 60–99 wt % of at least one poly(allyl carbonate) of a polyhydroxy alcohol, said polyhydroxy alcohol having from 2 to 20 carbon atoms and from 2 to 6 hydroxy groups in the molecule, less than 10 wt % of at least one diallyl phthalate type oligomer, 0–20 wt % of comonomers, and 0.01 to 10 wt % of a radical initiator. Exemplified are compositions comprising 5 wt % and 9,9 wt % of diallyl phthalate oligomer. These ophthalmic lenses have the advantages of improved tintability and a low rejection rate in their production due to the reduction in prerelease during polymerization casting. Preferably, the ophthalmic lenses are finished lenses. No mention is made of the effect of diallyl phthalate oligomer on mould damage.

The poly(allyl carbonates) of polyhydroxy alcohols may be used in the form of either monomers or oligomers. Monomers are usually obtained by using chloroformates. In this way, diethylene glycol diallyl carbonate can be obtained by reacting diethylene glycol bis(chloroformate) with allyl alcohol in the presence of an alkali, as described in Kirk-Othmer, *Encyclopedia of Chemical Technology*, 3rd ed., John Wiley & Sons, 1978, Vol. 2, p. 111. Monomers and oligomers of poly(allyl carbonates) of polyhydroxy alcohols can also be suitably obtained by means of transesterification reactions between diallyl carbonate and a polyhydroxy alcohol, as described in European patent application 0 035 304. In this way, monomers or mixtures of monomers and oligomers can be obtained, depending on the ratio of diallyl carbonate reagents to polyhydroxy alcohol. It is also possible to obtain mixed poly(allyl carbonates) of polyhydroxy alcohols by reacting a diallyl carbonate with a mixture of polyhydroxy alcohols in a transesterification reaction. These mixed poly(allyl carbonates) of polyhydroxy alcohols are also included in the present invention. Monomers of poly (allyl carbonates) of polyhydroxy alcohols are preferred for the ophthalmic lens of the present invention.

The polyhydroxy alcohols used in the preparation of poly(allyl carbonates) of polyhydroxy alcohols contain from 2 to 20 carbon atoms and from 2 to 6 hydroxy groups in the molecule. Examples of these alcohols are: ethylene glycol, diethylene glycol, triethylene glycol, tetraethylene glycol, 1,3-propylene glycol, 1,4-butanediol, 1,6-hexanediol, neopentyl glycol, 2,2,4-trimethyl-1,3-pentanediol, 1,4-dimethanol cyclohexane, 4,8-bis(hydroxyethyl) tricyclo(5, 2,1,0$^{2,6}$)decane, α,α'-xylenediol, 1,4-bis(hydroxyethyl) toluene, 2,2-(bis(4-hydroxyethyl)phenyl) propane, pentaerythritol, trimethylol propane, dipentaerythritol, ditrimethylol propane, and tris(hydroxyethyl) isocyanurate. The following polyhydroxy alcohols are preferred: diethylene glycol, 1,4-dimethanol cyclohexane, pentaerythritol, and tris(hydroxyethyl) isocyanurate.

Diallyl terephthalate oligomer and its preparation are known from U.S. Pat. No. 4,959,451, which is hereby incorporated by reference. The diallyl terephthalate oligomer can be prepared by several methods, such as the reaction between diallyl terephthalate and a diol in the presence of an ester interchange catalyst, with removal of allyl alcohol by distillation, or the reaction of dimethyl (or diethyl) terephthalate, diol, and allyl alcohol in the presence of an ester interchange catalyst, with removal of the methanol or ethanol by distillation. When moiety X is partly replaced by a residue of a polyol, the oligomer may be synthesized by using the diol in combination with a polyol or heating the oligomer of formula I and the corresponding polyol in the presence of an ester interchange catalyst. Diallyl isophthalate oligomer, oligomers of the formula I where the phenylene group is 1,2-substituted, or co-oligomers of the diallyl phthalate type oligomers of formula I may be prepared in the same manner. Preferred is the use of diallyl terephthalate oligomers in the present invention.

Another preferable embodiment of the present invention consists in diallyl phthalate oligomer having a degree of unsaturation of 20–100 in terms of the iodine value measured according to the Wijs method.

Examples of the diol include ethylene glycol, 1,2-propylene glycol, 1,4-butanediol, 1,6-hexanediol, 1,4-dimethanol cyclohexane, 1,3-butanediol, neopentyl glycol, 1,3-cyclohexanediol, p-xylene glycol, and styrene glycol, and other aliphatic and aromatic diols. Branched diols are preferable to linear ones. Examples of such branched diols include 1,2-propylene glycol, 1,3-butanediol, neopentyl glycol, 2,3-butanediol, 1,4-pentanediol, 1,3-pentanediol, 1,2-pentanediol, 2,3-pentanediol, 2,4-pentanediol, 1,5-hexanediol, 1,4-hexanediol, 1,3-hexanediol, 1,2-hexanediol, 2,3-hexanediol, 2,4-hexanediol, 2,5-hexanediol, and 3,4-hexanediol.

Examples of the polyols include aliphatic trihydric alcohols, such as glycerine and trimethylol propane, and aliphatic polyhydric alcohols, such as pentaerythritol and sorbitol.

Comonomers may optionally be present in the curable composition up to 20 wt %. These comonomers may be acrylic, vinylic or allylic. Examples include methyl acrylate, methyl methacrylate, phenyl methacrylate, vinyl acetate, vinyl benzoate, diallyl isophthalate, diallyl terephthalate, diallyl adipate, and triallyl cyanurate.

The compositions of the present invention also contain a polymerization initiator in quantities ranging from 0.01 to 10 wt %. This initiator should be soluble in the other components present in the composition to be cured and capable of producing free radicals at a temperature which ranges from 30° to approximately 100° C. Some unlimitative examples of such initiators are organic peroxide and percarbonate initiators, especially diisopropyl peroxydicarbonate, di cycl ohexyl peroxydicarbonate, di-sec-butyl peroxydicarbonate, dibenzoyl peroxide, and tert-butyl perbenzoate. For the purpose of the present invention, it is preferable for the polymerization initiator to be present in the composition in quantities from 1 to 8 wt %.

The composition may also contain one or more conventional additives to act as ultraviolet light absorbers, release agents, dyes, pigments, infrared light absorbers, etc., preferably in quantities not higher than 1 wt %.

The addition of high amounts of diallyl phthalate type oligomer to a composition comprising poly(allyl carbonate) of a polyhydroxy alcohol affects some properties of the lens composition to be cured and the resulting lens. In particular, the viscosity of the curable lens composition is increased with the addition of diallyl phthalate oligomer. Also the yellowing effect of UV light is increased when high amounts of diallyl phthalate oligomer are present. Compositions comprising 0.05 to 5 wt % do not have these disadvantages. Preferred is an ophthalmic lens which is the cured product of a composition comprising 0.1–3 wt % diallyl phthalate type oligomer, more preferably 0.2–2 wt %, most preferably 0.2–1.5 wt %.

The present invention also relates to a process for the preparation of ophthalmic lenses with a refractive index of 1.498 to 1.505 comprising polymerization casting of the above-described composition. The polymerization process is initiated by free radicals produced by decomposition of the radical initiator at a working temperature which generally ranges from 30° to 100° C. Under these conditions the time necessary for complete polymerization ranges from 0.5 to 100 hours.

Finally, the present invention relates to the use of at least one diallyl phthalate type oligomer of the above-described formula I in the production of ophthalmic lenses comprising the cured product of a composition comprising at least one poly(allyl carbonate) of a polyhydroxy alcohol, said polyhydroxy alcohol having from 2 to 20 carbon atoms and from 2 to 6 hydroxy groups in the molecule, a radical initiator, and, optionally, comonomers, to reduce mould damage in the manufacture of ophthalmic lenses.

The invention will be further illustrated by the following examples which are not to be construed as limiting the invention in any way. The scope of the invention is to be determined from the claims appended hereto.

EXAMPLES

Mould damage occurs by adhesion of the cured polymer to the glass mould. It is possible to measure the adhesion of the cured polymer to the glass with the aid of a tensile tester. To this end a monomer composition is polymerized between two parallel glass plates which are held together with a PVC-ring. After polymerization, the PVC-ring is removed and the top glass plate is pulled loose on one side on the tensile tester. This gives a tensile-elongation diagram as shown in FIG. 1, with the force necessary to pull the two glass plates away from each other plotted against the percentage of extension.

A good parameter for the adhesion to the glass mould is the overall release energy (E-total). This is the surface area under the above-mentioned diagram.

Required is an F-open which is comparable to the F-open of a composition prepared from diethylene glycol diallyl carbonate alone (lens A). The E-total has to be as low as possible. Furthermore, the Barcol hardness and the yellowness index also have to be comparable to the properties of lens A. Finally, the viscosity of the composition to be cured has to be low, and the refractive index of the resulting lens has to be between 1.498 and 1.505.

Examples 1 to 6

Comparative Examples A and B

A clear homogeneous solution was obtained by mixing diethylene glycol diallyl carbonate, diallyl terephthalate oligomer (AEO, see explanation below), and 2.7 wt % of diisopropyl peroxy dicarbonate (IPP), the whole solution being 100%. The mixture was degassed at approximately 20 mbar for about 15 minutes until gas evolution stopped. The glass mould assemblies were filled with the mixture. Polymerization took place in an oven with a polymerization cycle of 21 hours at a temperature rising exponentially from 45° to 80° C.

AEO=diallyl terephthalate oligomer, ex Showa Denko poly[oxy(methyl-1,2-ethanediyl)oxycarbonyl 1,4-phenylenecarbonyl] α-[4-((2-propenyloxy)carbonyl) benzoyl] ω-(2-propenyloxy), i.e., the oligomer of formula I, wherein X denotes methyl-1,2-ethanediyl,

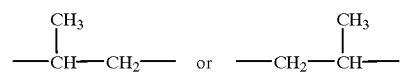

Table 1 lists the compositions which have been polymerized, mentioning the amounts of AE0 present in the composition and the properties of the resulting lenses, such as Barcol hardness (BH) and the yellowness index measured according to ASTM D1925-70, the F-open, the E-total, and the refractive index (RI).

TABLE 1

| lens | AEO (%) | BH | Y. I. (4 mm) | F-open (N) | E-total (joule) | Viscosity (cSt) | RI |
|------|---------|-----|--------------|------------|-----------------|-----------------|-------|
| A    | 0       | 27  | 0.9          | 106        | 0.20            | 15.1            | 1.498 |
| 1    | 0.05    | 27  | 0.9          | 104        | 0.20            | 15.1            | 1.499 |
| 2    | 0.2     | 26  | 0.9          | 112        | 0.12            | 15.2            | 1.499 |
| 3    | 0.5     | 27  | 0.9          | 70         | 0.03            | 15.4            | 1.500 |
| 4    | 1.5     | 27  | 1.0          | 62         | 0.02            | 16.0            | 1.501 |
| 5    | 3       | 26  | 1.0          | 53         | 0.03            | 17.0            | 1.501 |
| 6    | 5       | 26  | 1.0          | 62         | 0.03            | 18.5            | 1.502 |
| B    | 14      | 26  | 1.1          | 84         | 0.08            | 28.2            | 1.509 |

It is shown by the results in Table 1 for E-total that the lenses comprising the compositions of the present invention will result in a significant reduction of mould damage without other properties, such as yellowness index and barcol hardness, being affected. The composition which results in lens B has a too high viscosity to be employable in the lenses of the present invention. Also, the refractive index of lens B is too high for the present invention.

Example 7

Comparative Examples C and D

Compositions were prepared according to the procedure mentioned in Examples 1 to 6. However, in Comparative Example D instead of AEO, a monomer, i.e. diallyl terephtalate (DATP), was used. The results are listed in Table 2.

TABLE 2

| lens | additive (%) | F-open (N) | E-total (joule) |
|---|---|---|---|
| C | 0 | 107 | 0.21 |
| D | 0.5% DATP | 98 | 0.18 |
| 7 | 0.5% AEO | 87 | 0.09 |

It is shown by the results in Table 2 that the lens comprising the composition of the present invention will result in a significant reduction of mould damage as compared to the lens D known in the art.

We claim:

1. An ophthalmic lens with a refractive index from 1.498 to 1.505, comprising the cured product of a composition comprising 60–99 wt %. of at least one poly(allyl carbonate) of a polyhydroxy alcohol, said polyhydroxy alcohol having from 2 to 20 carbon atoms and from 2 to 6 hydroxy groups in the molecule, 0.01–10 wt % of at least one radical initiator, and 0–20 wt % of comonomers, wherein at least one diallyl phthalate type oligomer is present in the composition, in an amount of 0.1 to 3 wt % said diallyl phthalate type oligomer being of the formula I

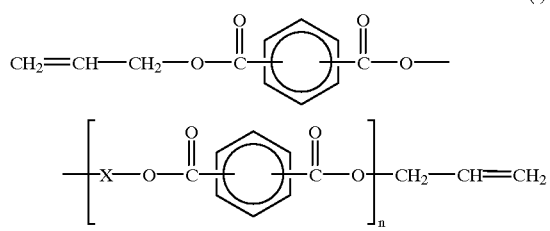

wherein X denotes a divalent hydrocarbon residue derived from a diol having 2–20 carbon atoms, optionally partly replaced by a residue derived from a polyol having 3 or more carbon atoms and 3–10 hydroxy groups, and n=1–100.

2. Ophthalmic lens of claim 1, wherein said diallyl phthalate type oligomer is present in said composition in an amount of 0.2 to 2 wt %.

3. Ophthalmic lens of claim 2, wherein said diallyl phthalate type oligomer is present in said composition in an amount of 0.2 to 1.5 wt %.

4. Ophthalmic lens of claim 1 wherein said diallyl phthalate oligomer has a degree of unsaturation of 20–100 in terms of iodine value measured according to the Wijs method.

5. Ophthalmic lens of claim 1 wherein said diallyl phthalate type oligomer is a diallyl terephthalate type oligomer.

6. Ophthalmic lens of claim 1 wherein said poly(allyl carbonate) of polyhydroxy alcohol is present in the composition in the form of a monomer.

7. Opthalmic lens of claim 6 wherein said monomer of poly(allyl carbonate) of polyhydroxy alcohol is diethylene glycol diallyl carbonate.

8. Process for the production of ophthalmic lenses with a refractive index of 1.498 to 1.505 comprising polymerization casting of a curable composition comprising 60–99 wt % of at least one poly(allyl carbonate) of a polyhydroxy alcohol, said polyhydroxy alcohol having from 2 to 20 carbon atoms and from 2 to 6 hydroxy groups in the molecule, 0.01 to 10 wt % of at least one radical initiator, and 0–20 wt % of comonomers, at 30–100° C. for 0.5–100 hours, wherein the polymerization casting is carried out in the presence of at least one diallyl phthalate type oligomer in an amount of 0.1 to 3 wt %, said diallyl phthalate type oligomer being of the formula I

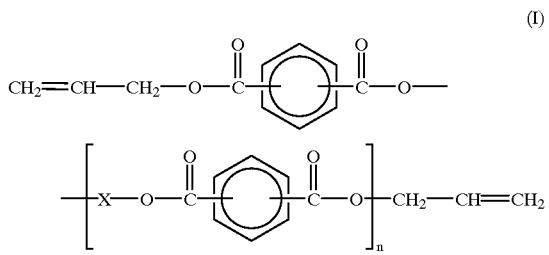

wherein X denotes a divalent hydrocarbon residue derived from a diol having 2–20 carbon atoms, optionally partly replaced by a residue derived from a polyol having 3 or more carbon atoms and 3–10 hydroxy groups, and n=1–100.

9. A method of reducing mould damage during the preparation of ophthalmic lenses which are prepared by polymerization casting of a curable composition comprising at least one poly(allyl carbonate) of a polyhdroxy alcohol, said polyhydroxy alcohol having from 2 to 20 carbon atoms and from 2 to 6 hydroxy groups in the molecule, at least one radical initiator, and 0–20 wt % of comonomers, said method comprising carrying out said polymerization casting in the presence of a diallyl phthalate type of oligomer of the formula I

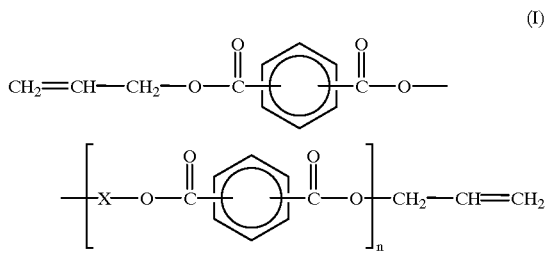

wherein X denotes a divalent hydrocarbon residue derived from a diol having 2–20 carbon atoms, optionally partly replaced by a residue derived from a polyol having 3 or more carbon atoms and 3–10 hydroxy groups, and n=1–100.

10. The method of claim 9 wherein said opthalmic lenses have a refractive index of 1.498 to 1.505.

11. The method of claim 9 wherein said composition comprises 60–99 wt % of a poly(allyl carbonate) of a polyhydroxyl alcohol, 0.01 to 10 wt % of a radical initiator and 0–20 wt % of comonomers.

* * * * *